US009583742B2

(12) United States Patent
Munenaga et al.

(10) Patent No.: US 9,583,742 B2
(45) Date of Patent: Feb. 28, 2017

(54) METHOD OF MANUFACTURING BATTERY, AND BATTERY

(75) Inventors: Noriyoshi Munenaga, Shiga (JP); Taku Nakamura, Shiga (JP); Wataru Mashiko, Shiga (JP); Takeshi Kawahara, Shiga (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 1153 days.

(21) Appl. No.: 13/477,797

(22) Filed: May 22, 2012

(65) Prior Publication Data
US 2012/0301779 A1    Nov. 29, 2012

(30) Foreign Application Priority Data

May 25, 2011   (JP) .................................. 2011-117225
Apr. 16, 2012  (JP) .................................. 2012-093354

(51) Int. Cl.
*H01M 2/04*    (2006.01)
*H01M 6/02*    (2006.01)
*H01M 2/02*    (2006.01)
*H01M 10/04*   (2006.01)

(52) U.S. Cl.
CPC .......... *H01M 2/024* (2013.01); *H01M 2/0217* (2013.01); *H01M 10/0413* (2013.01); *H01M 10/0431* (2013.01); *Y10T 29/49108* (2015.01)

(58) Field of Classification Search
CPC ............................ H01M 2/024; H01M 2/0217
USPC .......................................... 429/178; 29/623.1
See application file for complete search history.

(56) References Cited

U.S. PATENT DOCUMENTS

| 2,087,026 | A | | 7/1937 | Geyer |
| 4,010,043 | A | * | 3/1977 | Schneider ........... H01M 2/0202 29/592.1 |
| 5,916,707 | A | | 6/1999 | Omaru et al. |
| 6,296,967 | B1 | * | 10/2001 | Jacobs ................ H01M 2/1061 429/181 |

(Continued)

FOREIGN PATENT DOCUMENTS

| JP | H 09-199089 A | 7/1997 |
| JP | 2001-236929 A | 8/2001 |

(Continued)

OTHER PUBLICATIONS

European Search Report dated Nov. 5, 2014.

*Primary Examiner* — Jonathan G Leong
*Assistant Examiner* — Anne R Dixon
(74) *Attorney, Agent, or Firm* — McGinn IP Law Group, PLLC

(57) ABSTRACT

A battery comprises: a container including a bottom portion, long-sidewall portions each standing on a corresponding one of longer side portions of the bottom portion, short-sidewall portions each standing on a corresponding one of two shorter side portions of the bottom portion, and a welded portion in which portions of a flat plate are mutually welded; an electrode assembly housed in the container; an electrode terminal; and a lid closing the container, the container having a cuboid shape, the bottom portion being rectangular, the long-sidewall portions each being rectangular, the short-sidewall portions each being rectangular, the flat plate being made of metal and being folded, and the portions of the flat plate being mutually abutting or overlapping.

15 Claims, 7 Drawing Sheets

(56) References Cited

U.S. PATENT DOCUMENTS

| | | | | |
|---|---|---|---|---|
| 2005/0214597 A1* | 9/2005 | Kim | .................... | H01M 2/0404 429/7 |
| 2008/0166628 A1 | 7/2008 | Kim et al. | | |
| 2009/0246621 A1* | 10/2009 | Miebori | .............. | H01M 2/0212 429/179 |
| 2011/0236750 A1* | 9/2011 | Kohno | ................ | H01M 2/0404 429/181 |

FOREIGN PATENT DOCUMENTS

| | | |
|---|---|---|
| JP | 2002-198011 A | 7/2002 |
| JP | 2004-349201 A | 12/2004 |
| JP | 2005-196991 A | 7/2005 |
| JP | 2006-040684 A | 2/2006 |
| JP | 2009-004361 A | 1/2009 |
| JP | 2012-133913 A | 7/2012 |

* cited by examiner

METHOD OF MANUFACTURING BATTERY, AND BATTERY

CROSS REFERENCE TO RELATED APPLICATIONS

The present application is based on and claims priority of Japanese Patent Application No. 2011-117225 filed on May 25, 2011 and Japanese Patent Application No. 2012-093354 filed on Apr. 16, 2012. The entire disclosures of the above-identified application, including the specification, drawings and claims are incorporated herein by reference in its entirety.

TECHNICAL FIELD

The present invention relates to batteries such as secondary batteries for housing, in an enclosure, an electricity storage and discharge means such as an electrode assembly and an electrolyte solution, and especially relates to a battery with reduced weight and increased electric current.

BACKGROUND ART

Recently, moving vehicles using electric power as part or the whole of the driving source, such as hybrid vehicles and electric vehicles, have attracted attention, and non-aqueous secondary batteries with high energy capacity have been commercialized as power sources of the moving vehicles. For example, a lithium-ion battery or the like can be cited as a rechargeable battery with the high energy capacity.

A secondary battery installed in moving vehicles such as an automobile uses a structure for housing an electrode assembly and a current collector in an enclosure which is made of metal and the like and which has a high stiffness and a rectangular shape (for example, refer to Patent Literature 1).

Moreover, recently, weight reduction is one of the other capabilities required for a secondary battery installed in automobiles and the like, and the weight of the secondary battery has been reduced by using aluminum as a material of the enclosure and by reducing a thickness of the enclosure made of stainless steel.

CITATION LIST

Patent Literature

Patent Literature 1: Japanese Unexamined Patent Application Publication No. 2004-349201

Although reducing the thickness of the enclosure has been considered in order to reduce the weight of a secondary battery, it is considered to be almost impossible to further reduce the weight of the second battery by reducing the thickness of the enclosure while satisfying structural strength allowable for the secondary battery installed in the moving vehicle.

SUMMARY OF INVENTION

According to a first aspect of the invention, a method of manufacturing a battery, includes a container including a bottom portion, long-sidewall portions each standing on a corresponding one of longer side portions of the bottom portion, and short-sidewall portions each standing on a corresponding one of shorter side portions of the bottom portion, an electrode assembly housed in the container, a lid closing the container, and an electrode terminal, the container having a cuboid shape, the bottom portion being rectangular, the long-sidewall portions each being rectangular, and the short-sidewall portions each being rectangular, the manufacturing method comprising: folding a flat plate to form a shape of the container, the flat plate being made of metal and having an unfolded form of the container; and welding portions of the flat plate which are mutually abutting or overlapping after the folding.

With this configuration, an overall part of a flat plate on which plastic deformation is performed for manufacturing the container can be limited. Therefore, a decrease in thickness caused by plastic deformation of a component made of metal can be limited within a small range. Furthermore, since parts which are plastically deformed correspond to corners of the container, it is possible to prevent the structural strength of the plastically deformed parts from decreasing as much as possible.

In the folding process, the flat plate may be folded at two longer side corresponding portions that are portions of the flat plate which correspond to the longer side portions, and end portions of long-sidewall portions may be folded at respective folding lines extending in a direction perpendicular to the longer side corresponding portions, the end portions being along the respective longer side portions, and the long-sidewall corresponding portions corresponding to the flat plate which correspond to the long-sidewall portions.

With this configuration, since the long-sidewall portion which has the largest area in the container is formed by folding, the structural strength of the flat plate can be adopted for the long-sidewall portion without any decrease in the strength. Furthermore, since a weld distance can be decreased, welding costs can be reduced, productivity can be enhanced, and a decrease in structural strength due to welding can be prevented as much as possible.

In the folding process, all the folding lines of both end portions of the two long-sidewall corresponding portions may be folded, the both end portions being along the longer side portions.

With this configuration, since the welded portion is generated in the intermediate part of the short-sidewall portion, the position of the end portion of the welded portion is not identical to the position of the end portion of another welded portion connecting the bottom portion and the short-sidewall portion (for example, in the case where two welding portions in a linear fashion form a T shape). Therefore, a welding defect in the case where the positions of the end portions of the welded portions are identical (for example, two welding portions in a linear fashion form an L shape) can be avoided.

Moreover, since both end portions in a direction along longer side portions are folded in each of the two long-sidewall corresponding portions, the short-sidewall portions (the short-sidewall corresponding portions) function as ribs of the long-sidewall portions (the long-sidewall corresponding portions), and the resistance of the long-sidewall portions (the long-sidewall corresponding portions) against deflection can be enhanced. Therefore, each of the long-sidewall corresponding portions can be prevented from deforming as much as possible in the folding process, and the structural strength of the container having a cuboid shape after completion can be sufficiently secured.

Moreover, in the case where the welded portions are L-shaped, among four corner parts of the opening portion of the container, two are formed by welding and the other two are formed by folding, but it is difficult for the shapes of the corner parts formed by welding to be identical to the shapes of the corner parts formed by folding, and therefore the shapes of the corner parts formed by welding are different from the shapes of the corner parts formed by folding. In this case, the shapes of the corner parts of a lid installed on the container also have to correspond to each of the shapes of the corner parts of the container, and in the installation of the lid on the container, the lid and the container must be disposed such that the shapes of the corner parts of the lid are identical to the shapes of the corner parts of the container. By locating the welded portions in the intermediate parts of the short-sidewall portions, the four corner parts of the opening portion of the container are all formed by folding, that is, all the shapes of the four corner parts can be the same, and in this case, the shapes of all the corner parts of the lid are also the same, with a result that no attention has to be paid to the shapes of the corner parts in the installation of the lid on the container and productivity can be enhanced.

In the welding process, welding may be performed such that a difference in dimension between the bottom portion of the container and a corresponding opening portion is less than or equal to 1 mm.

This is a structure which can be realized by adopting the present manufacturing method, and the method produces the following secondary effect. This is a new effect obtained from the discovery by the inventors that in the conventional deep drawing molding, a taper, albeit slight, is generated on the whole container and the taper has a negative effect on the capability of a battery especially a battery life when a plurality of batteries are tightly arranged.

In other words, according to the present invention, ideally, by manufacturing a battery such that all container planes intersect perpendicular to each other, in the case where a plurality of batteries are arranged, the batteries can be arranged without space between the adjacent batteries. Therefore, a volume for batteries to be arranged can be reduced. Because containers made of metal can be arranged with the adjacent planes firmly attached to each other, the heat transfer efficiency between batteries can be increased. Moreover, since the rattle of the whole batteries which are arranged can be decreased, vibration resistance can be enhanced.

Furthermore, the method may include forming bulge portions each on a corresponding one of the long-sidewall corresponding portions that are portions of the flat plate which correspond to the long-sidewall portions.

With this, by the formation of the bulge portion, the structural strength of the long-sidewall corresponding portion is enhanced, and the long-sidewall corresponding portion having the largest area can be prevented from deforming in the folding process.

Moreover, it is possible to easily manufacture a battery which can prevent swelling caused by an increase in internal pressure.

According to a second aspect of the invention, a battery comprises: a container including a bottom portion, long-sidewall portions each standing on a corresponding one of longer side portions of the bottom portion, short-sidewall portions each standing on a corresponding one of shorter side portions of the bottom portion, a welded portion in which portions of a flat plate are mutually welded, the container having a cuboid shape, the bottom portion being rectangular, the long-sidewall portions each being rectangular, the short-sidewall portions each being rectangular, the flat plate being made of metal and being folded, and the portions of the flat plate being mutually abutting or overlapping; an electrode assembly housed in the container; a lid closing the container; and an electrode terminal.

With this configuration, since the overall plastically deformed part is limited in the container, part in which a thickness is decreased is smaller than the overall area of the container. Furthermore, since each of the parts which are plastically deformed corresponds to each of the corners of the container, it is possible to manufacture a battery in which a decrease in the structural strength of the plastically deformed parts is prevented as much as possible.

Moreover, the welded portion may be located in each of the short-sidewall portions.

With this, the structural strength of the long-sidewall portions can be maintained at a high state. Furthermore, since a weld distance is short, welding costs can be reduced, productivity can be enhanced, and a decrease in structural strength caused by welding can be prevented as much as possible.

Moreover, since the welded portions are disposed on the short-sidewall portions which do not easily swell even if internal pressure of a battery is increased under environment such as overcharge or high temperature, an amount of deformation of the welded portions caused by the swelling of the container can be decreased.

Moreover, a difference in dimension between the bottom portion and a corresponding opening portion of the container may be less than or equal to 1 mm.

With this, in the case where a plurality of batteries are arranged, it is possible for batteries to be arranged without space between the adjacent batteries. Therefore, a volume for batteries to be arranged can be reduced. Moreover, since containers made of metal can be arranged with the adjacent planes firmly attached to each other, the heat transfer efficiency between batteries can be increased. Moreover, since the rattle of the whole batteries which are arranged can be prevented, vibration resistance can be enhanced.

Moreover, a variation in thickness of the long-sidewall portions may be less than or equal to 1% of a maximum thickness of the long-sidewall portions.

With this, since in the long-sidewall portion having the largest area, there is no part in which the structural strength is inferior because a thickness is partially small, the structural strength can be maintained at greater than or equal to an allowable value even when the thickness of the whole battery is reduced, and the weight of the battery can be reduced.

Moreover, the welded portion may include a first welded part and a second welded part, the first welded part being provided at an intermediate part of each of the short-sidewall portions and extending in a direction intersecting a plane of the bottom portion, and the second welded part extending in a direction intersecting the first welded part and joining each of the short-sidewall portions and the bottom portion.

With this, the structural strength of the battery can be enhanced.

Moreover, the long-sidewall portions each may include a bulge portion which bulges inward of the battery.

With this, the structural strength of the battery can be enhanced. Moreover, the surface area of the battery can be increased and heat dissipation efficiency can be enhanced. Especially, the swelling of the battery caused by an increase in battery internal pressure can be prevented. Moreover, by restricting vibration width of an electrode assembly in the battery, damage in the battery caused by vibration and the like can be decreased.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings.

DESCRIPTION OF EMBODIMENT

The inventors of the present invention have found out through their experiment and research that a conventional method of manufacturing an enclosure by deep drawing molding or the like produces a great variation in thickness, concluding that when the thickness of the whole enclosure is tried to be reduced, part of the thickness is too small to satisfy structural strength.

The present invention is based on the above described knowledge and has an object to provide a method of manufacturing a battery which can ensure a reduced weight while maintaining structural strength necessary for an enclosure of a battery such as a secondary battery, and such a battery.

Next, an embodiment of a battery according to the present invention and a method of manufacturing a battery will be described with reference to the drawings. It should be noted that the following embodiment is mere examples of a battery and a method of manufacturing a battery according to the present invention. Therefore, the scope of the present invention is defined by the words in the claims with reference to the following embodiment and is not limited only to the following embodiment.

Figure 1:
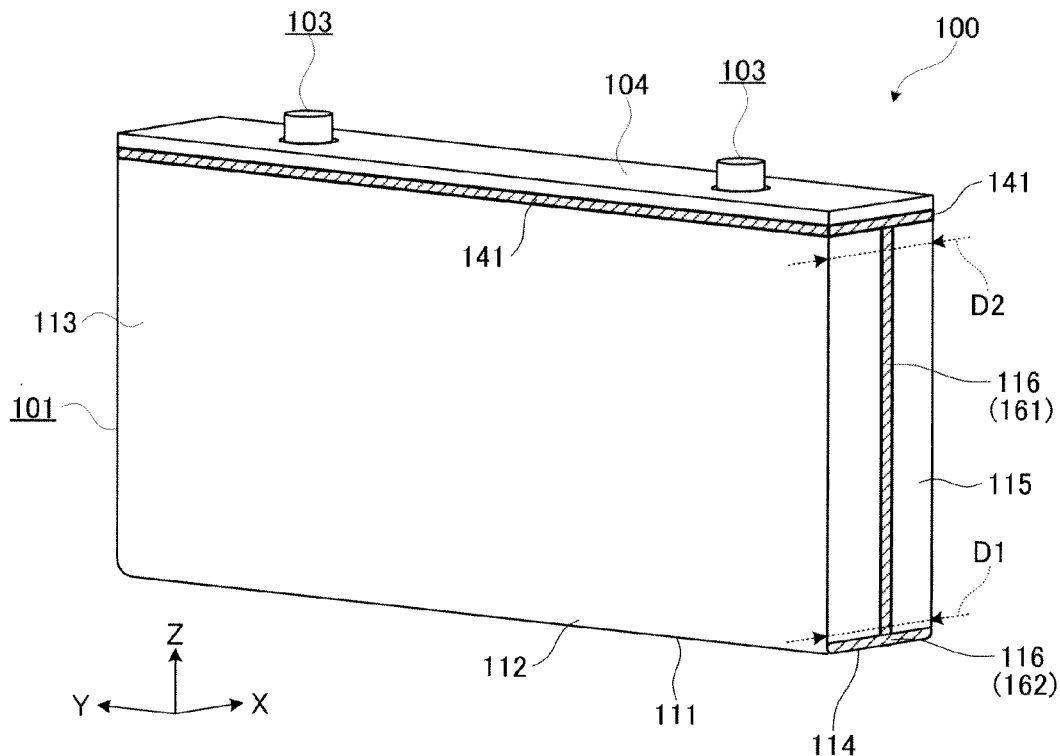
FIG. 1 is a schematic perspective view of a surface appearance of a battery from one side.

FIG. 1 is a schematic perspective view of the surface appearance of the battery from one side.

Figure 2:
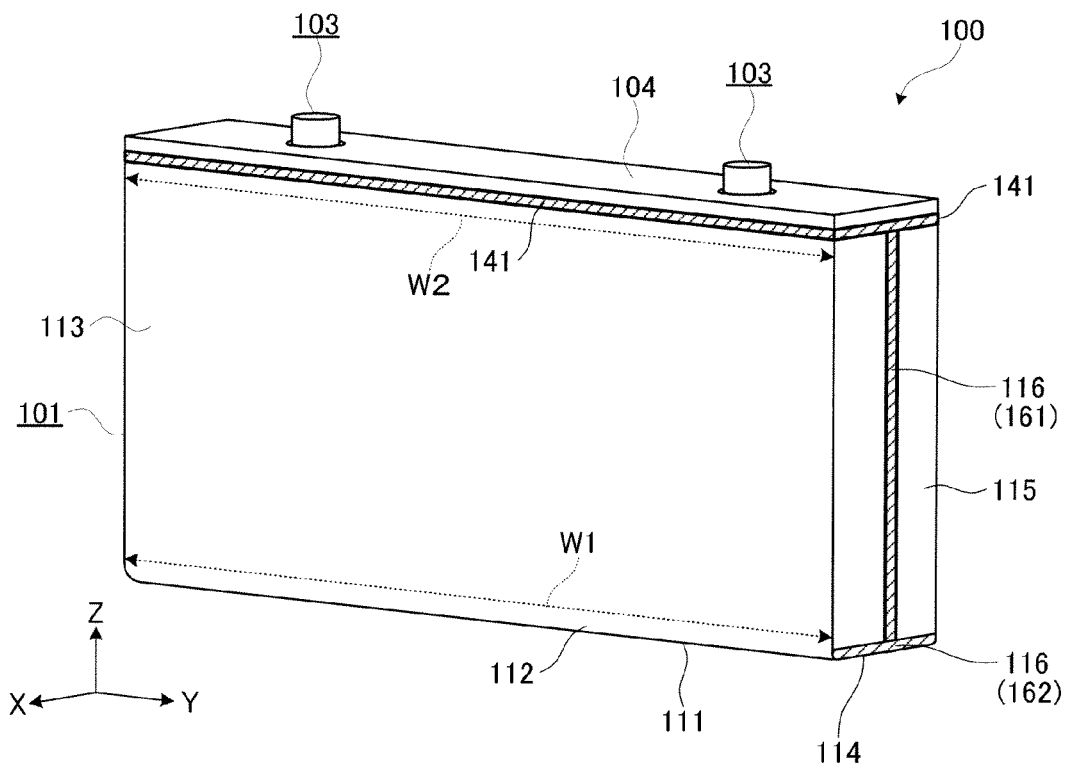
FIG. 2 is a schematic perspective view of the surface appearance of the battery from the opposite side to FIG. 1.

FIG. 2 is a schematic perspective view of the surface appearance of the battery from the opposite side to FIG. 1.

Figure 3:
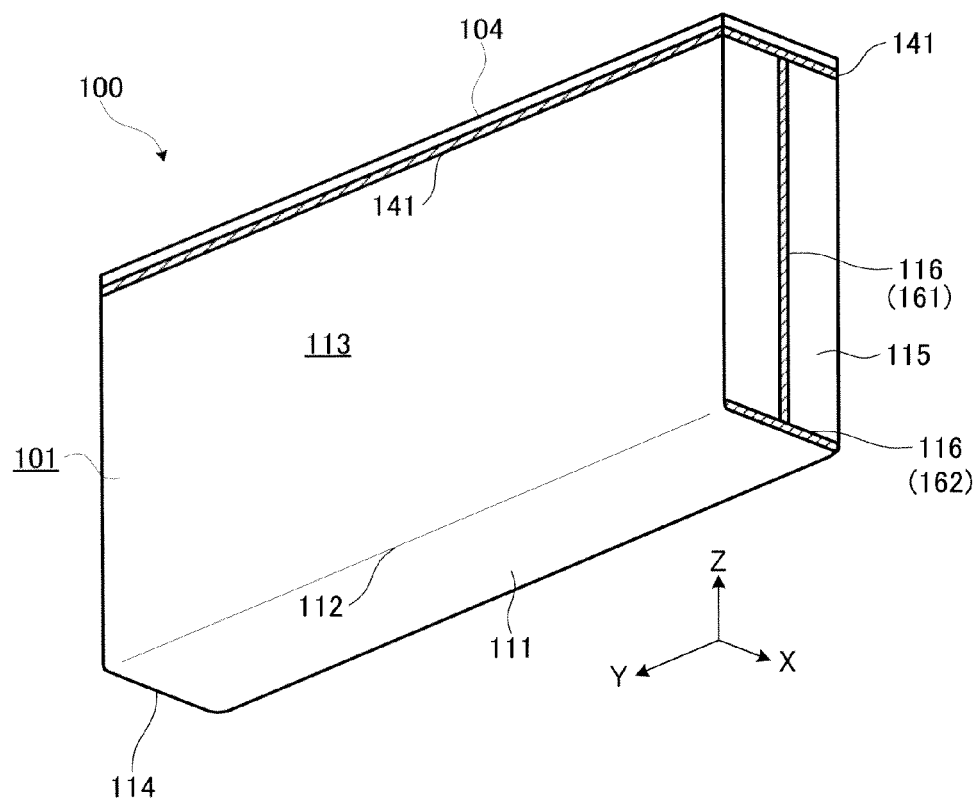
FIG. 3 is a schematic perspective view of the surface appearance of the battery from an orientation of a bottom portion.

FIG. 3 is a schematic perspective view schematically of the surface appearance of the battery from an orientation of the bottom portion.

Figure 4:
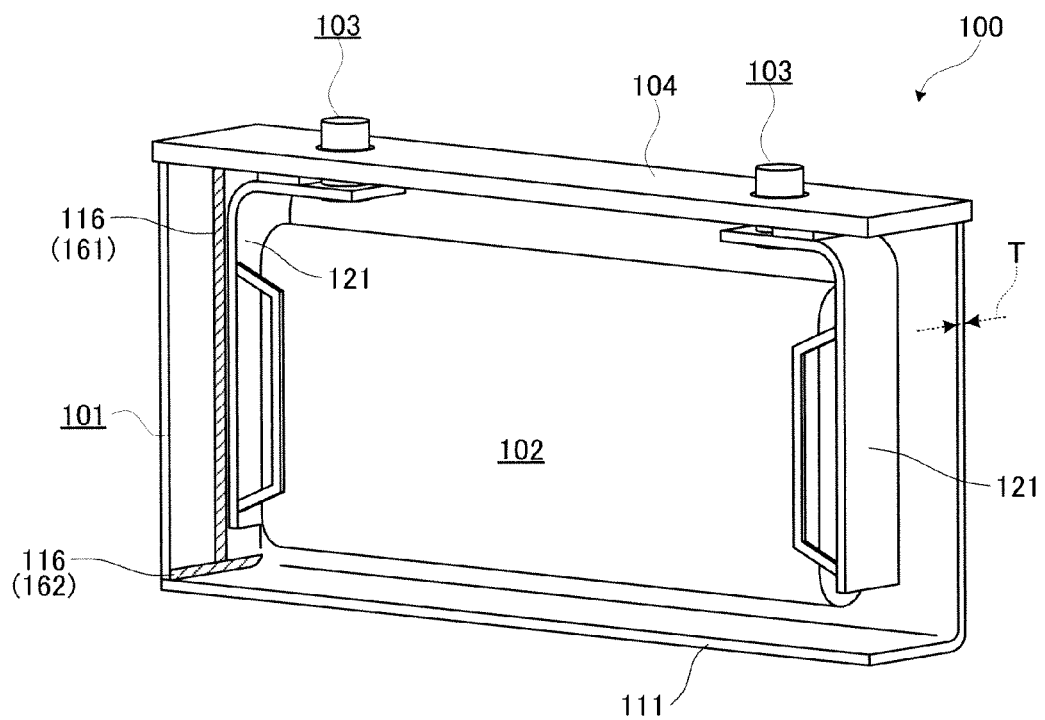
FIG. 4 is a perspective view of the inside of the battery with an illustration of a container partially omitted.

FIG. 4 is a perspective view of the inside of the battery with the illustration of a container partially omitted.

As shown in the drawings, a battery 100 according to the present embodiment is a non-aqueous electrolyte secondary battery (for example, a lithium-ion battery) which can be charged and discharged, and the battery 100 includes a container 101, an electrode assembly 102, and a lid 104.

The container 101 is a component having a cuboid shape and made of metal, including a bottom portion 111 having a rectangular shape, long-sidewall portions 113 each having a rectangular shape and each standing on a corresponding one of longer side portions 112 of the bottom portion 111, short-sidewall portions 115 each having a rectangular shape and each standing on a corresponding one of shorter side portions 114 of the bottom portion 111. Moreover, the container 101 includes a welded portion 116 which is joined by welding. In the present embodiment, the container 101 is made of a stainless steel plate. Moreover, the container 101 also includes a third welded part 141 which is formed when the container 101 and the lid 104 are joined together by welding.

It should be noted that metal constituting the container 101 is not especially limited and may be a plated steel sheet, aluminum, or an alloy.

The long-sidewall portion 113 is a portion which has the largest area in the container 101 and has a rectangular plate. A variation in thickness T of the long-sidewall portion 113 (refer to FIG. 4) is in less than or equal to 1% of the maximum thickness T of the long-sidewall portion 113. With this, since the thickness of the long-sidewall portion 113 is uniform, the structural strength of the long-sidewall portion 113 is almost uniform. In the present embodiment, a variation in not only the thickness T of the long-sidewall portion 113 but also a variation the thickness for each of the bottom portion 111 and the short-sidewall portion 115 is less than or equal to 1% of the maximum thickness T.

The short-sidewall portion 115 is a portion which has the smallest area in the container 101 and has a rectangular plate. In the present embodiment, the short-sidewall portion 115 is divided into two parts in the intermediate portion of a direction (X-axis direction) of which the shorter side portion 114 of the bottom portion 111 is extending. Furthermore, the short-sidewall portions 115 are joined by welding when the divided two portions are mutually abutting in a planar state. In other words, the joint portion is the welded portion 116. Moreover, the welded portion 116 provided in the intermediate portion of the short-sidewall portion 115 is located in a direction intersecting a plane of the bottom portion 111, serving as a first welded part 161.

Furthermore, the short-sidewall portion 115 is joined by welding when the short-sidewall portion 115 and the shorter side portion 114 of the bottom portion 111 are mutually abutting in a perpendicular state. The joint portion is also the welded portion 116. Moreover, the welded portion 116 which joins the short-sidewall portion 115 and the bottom portion 111 is located by extending in a direction intersecting the first welded part 161, and serves as a second welded part 162 which is located in an abutting state with an end portion of the first welded part 161.

As described above, by locating the welded portion 116 in the short-sidewall portion 115, a total weld distance for the welded portion 116 can be shortest and a decrease in the structural strength of the container 101 caused by welding can be prevented as much as possible. Moreover, an occurrence probability of liquid leakage caused by a welding defect can be decreased. Furthermore, by joining, through welding, the shorter side portion 114 divided into two parts in an X-axis direction, it is possible for the welded portion 116 to almost avoid a state of being located in the long-sidewall portion 113. Therefore, the long-sidewall portion 113 can almost avoid a decrease in the structural strength caused by welding. Furthermore, since part of the short-sidewall portion 115 is formed by folding both end portions in a direction along the longer side portions 112 in each of the two long-sidewall portions 113, the short-sidewall portion 115 functions as a rib of the long-sidewall portion 113 and enhances the resistance of the long-sidewall portion 113 against deflection.

Furthermore, in the present embodiment, a difference in dimension between the bottom portion 111 of the container 101 and a corresponding opening portion of the container 101 is less than or equal to 1 mm. Specifically, as shown in FIG. 1, a difference between a dimension D1 of the shorter side portion 114 of the bottom portion 111 and a dimension D2 of the corresponding opening portion of the container 101 is less than or equal to 1 mm, and, ideally, the difference between the dimension D1 and the dimension D2 is nearly zero. Similarly, as shown in FIG. 2, a difference between a width W1 of the longer side portion 112 of the bottom portion 111 and a width W2 of the corresponding opening portion of the container 101 is less than or equal to 1 mm, and, ideally, the difference between the width W1 and the width W2 is nearly zero.

Figure 5:
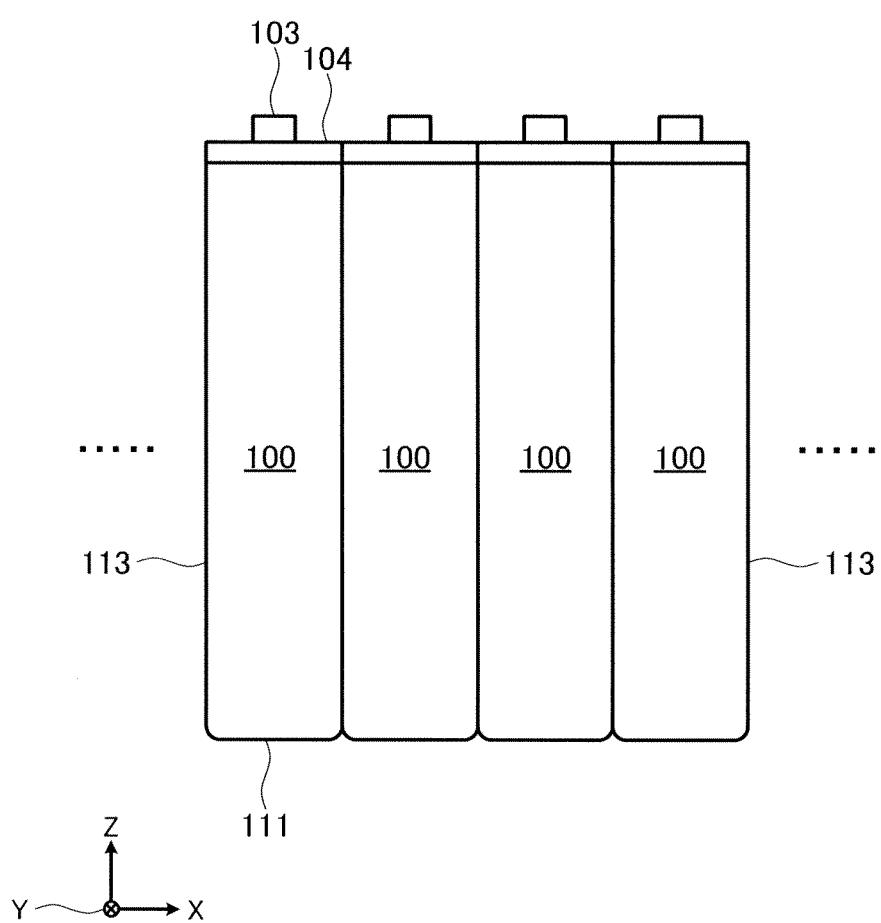
FIG. 5 is a side view of a state in which batteries are tightly arranged without space between the adjacent batteries.

As described above, by causing the long-sidewall portion 113 and the short-sidewall portion 115 to stand in perpendicular to the bottom portion 111, as shown in FIG. 5, a plurality of batteries 100 can be arranged without space between the adjacent batteries and thus a heat transfer coefficient between the batteries 100 can be enhanced. Moreover, it is possible for the batteries 100 to be arranged without waste in a space.

Moreover, since the welded portion 116 is generated in the intermediate portion of the short-sidewall portion 115, the position of the end portion of the first welded part 161 is not identical to the end portion of the second welded part 162, with a result that the present embodiment shows a T-shaped state. With this, a welding defect caused by the case where the end portions of the welded portion 116 are identical to each other (for example, in the case where an L-shape is formed), for example, a state in which penetration of the flat plate is deep, can be avoided. Moreover, in order to avoid the welding defect, it is possible to dispense with a fine control such as a decrease in welding output in a portion where the penetration is deep.

Moreover, since both end portions in a direction along the longer side portions are folded in each of the two long-sidewall corresponding portions, the short-sidewall portion 115 (the short-sidewall corresponding portion) functions as a rib of the long-sidewall portion 113 (the long-sidewall corresponding portion 213) and the resistance of the long-sidewall portion 113 (the long-sidewall corresponding portion 213) against deflection can be enhanced. Therefore, the long-sidewall corresponding portion 213 can be prevented from deforming in the folding process as much as possible and the structural strength of the container having a cuboid shape after completion can be sufficiently secured.

The lid 104 is provided with electrode terminals 103 and is a component which closes the container 101 and has a rectangular plate. The lid 104 is almost as large as the container 101 and is joined to the container 101 by welding.

Each of the electrode terminals 103 is a terminal which derives electricity from the electrode assembly where electricity is stored in the electrode assembly 102 and introduces electricity into the inside for storing electricity in the electrode assembly 102. In the present embodiment, the electrode terminal 103 is provided on each of both end portions of the lid 104 having a long plate shape.

It should be noted that the electrode terminals 103 may be provided not only with the lid 104 but also with the container 101. Furthermore, the container 101 may function as the electrode terminals 103.

A detail illustration of the electrode assembly 102 is omitted in the present embodiment, but the electrode assembly 102 includes a separator, an anode, and a cathode, and is a component which can store electricity. The anode is formed by formation of an anode active material layer on the surface of an anode current collector sheet which is made of copper and has a long plate shape. The cathode is formed by formation of a cathode active material layer on the surface of a cathode current collector sheet which is made of aluminum and has a long plate shape. The separator is a sheet which is made of resin and has a microporous structure. Then, the electrode assembly 102 is a so-called longitudinally-wound electrode assembly which is formed by spirally winding together a layered structure in which the separator is sandwiched between the anode and the cathode such that the whole is oval-shaped in a longitudinal direction. Moreover, a current collector components 121 is located on each of both end portions in a winding axis direction of the electrode assembly 102 (Y-axis direction in the drawing) by extending in a direction perpendicular to the winding axis of the electrode assembly 102.

It should be noted that the separator may be made of not only resin but also other materials such as a glass fiber. Moreover, in the drawing, the electrode assembly 102 is illustrated as if it were a solid object, but the actual electrode assembly 102 includes, in the central portion, a central space which has a tubular shape and which is extending along a winding axis. Moreover, a cross-sectional shape intersecting the winding axis of the central space is elliptical, oval, or the like.

Next, a method of manufacturing the battery 100 will be described.

Figure 6:
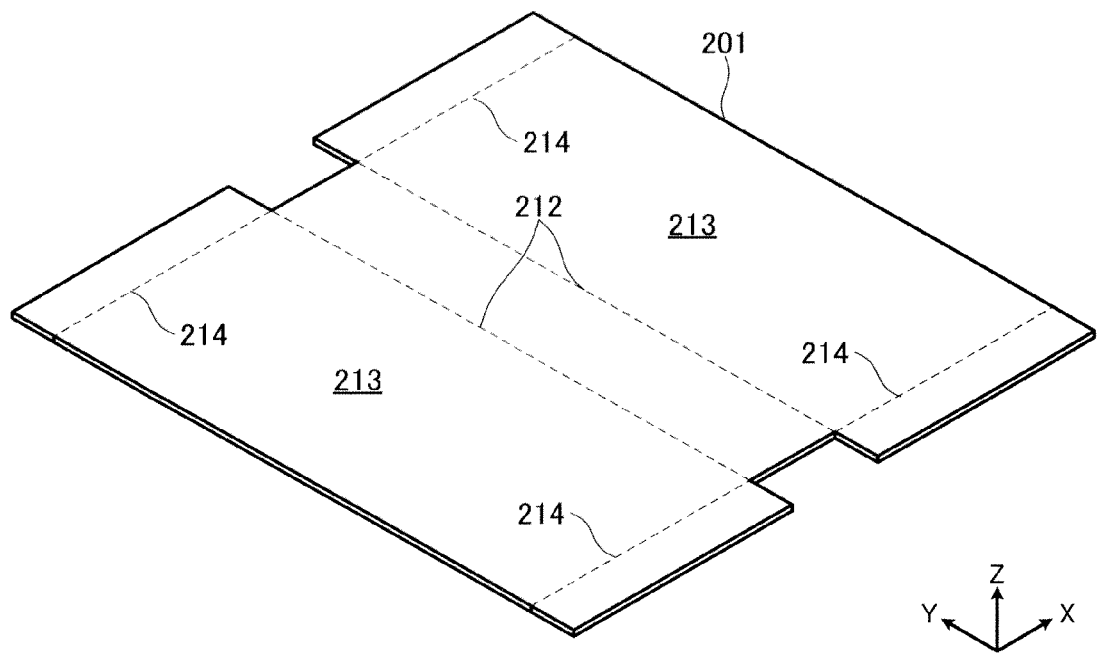
FIG. 6 is a perspective view of a flat plate.

FIG. 6 is a perspective view showing a flat plate made of metal.

It should be noted that in FIG. 6, a thickness of a flat plate 201 is illustrated with a thickness which is shown exaggeratedly large with respect to an actual thickness for emphasis, but the thickness of the flat plate 201 is a thickness selected from a range from 0.3 mm to 0.8 mm.

First, a sheet of the flat plate 201 which is made of metal and which is an unfolded form of the container 101 is prepared. A material of the flat plate 201 is not especially limited as long as the material is metal, but stainless steel is used in the present embodiment. It should be noted that the flat plate 201 is obtained from a large metal plate through a blanking work or the like.

Figure 7:
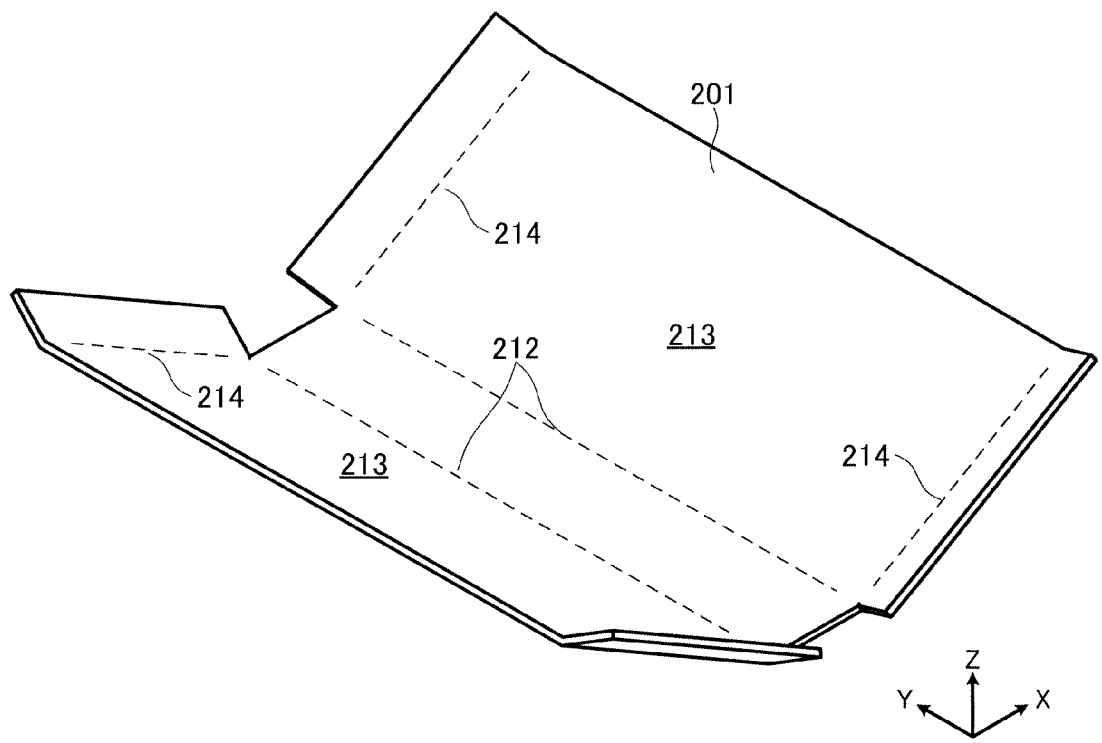
FIG. 7 is a perspective view of a midstream of a folding process.
Figure 8:
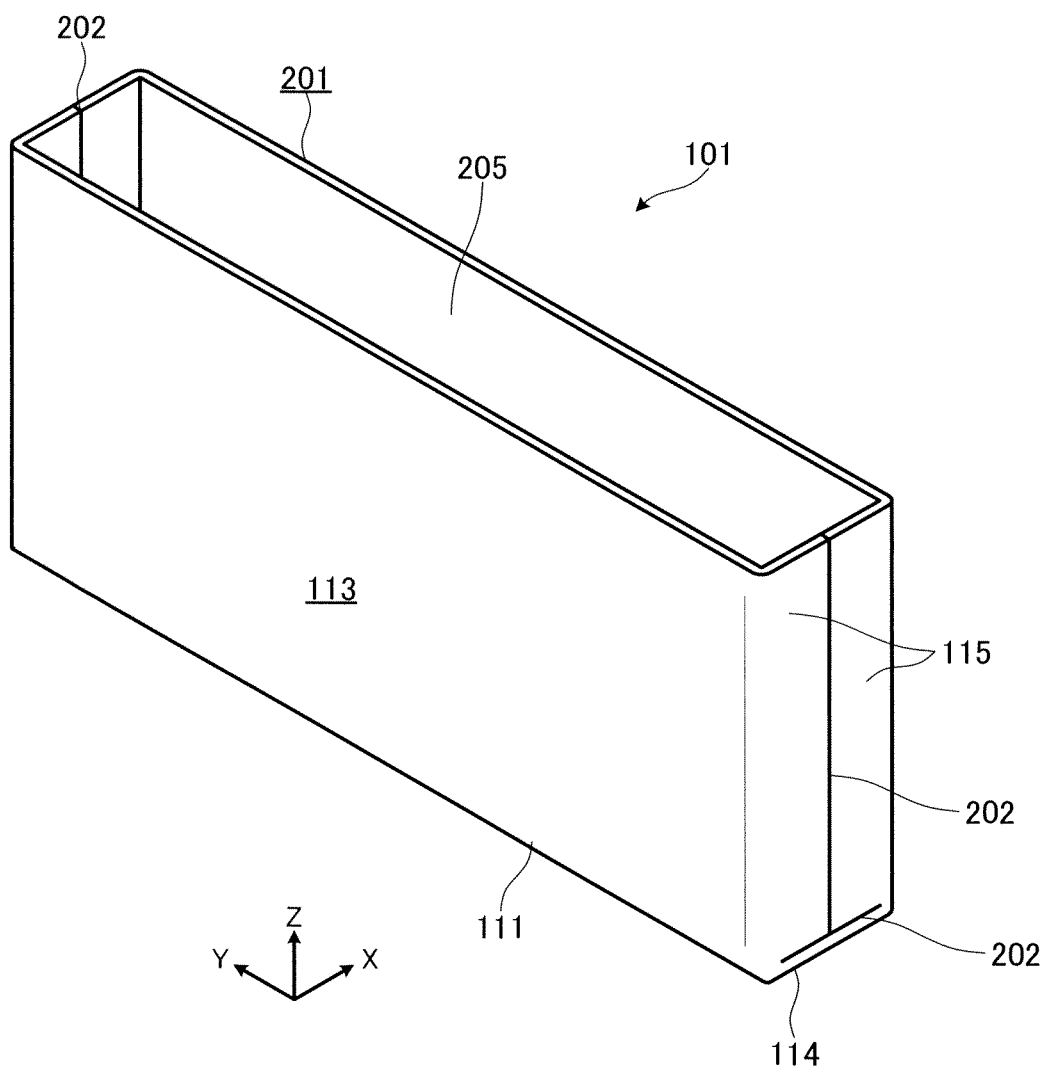
FIG. 8 is a perspective view of the container before a welding process.

Next, the flat plate 201 is folded by a folding process as shown in FIG. 7. The folding process is performed until a shape of the container 101 is formed (folding step). In the present embodiment, the flat panel 201 is folded at two longer side corresponding portions 212 which are portions of the flat plate 201 and correspond to the longer side portions 112, and the end portions in a direction along the longer side corresponding portions 212 (longer side portions 112) of the long-sidewall corresponding portions 213 which are portions of the flat plate 201 and correspond to the long-sidewall portion 113 are folded at folding lines 214 each extending in a direction perpendicular to the longer side corresponding portions 212.

Next, abutting portions 202 which are portions of the flat plate 201 and which are mutually abutting after the folding step are joined by welding (welding step). In the present embodiment, a joint by welding is performed for the abutting portions 202 which are abutting in a planar manner in the short-sidewall portion 115 divided in an X-axis direction and for the abutting portions 202 which are abutting between the short-sidewall portion 115 and the bottom portion 111 in a perpendicular manner.

It should be noted that the welding method is not especially limited and any welding method such as laser welding and tungsten inert gas (TIG) welding can be adopted. Moreover, welding may be performed by locating, on a portion to be joined by welding, another component which serves as a melting portion.

As described above, the container 101 having an opening portion 205 on a surface and having a cuboid shape with a bottom is manufactured.

Next, another method of manufacturing the battery 100 will be described. It should be noted that descriptions about processes common to the above mentioned manufacturing method will be omitted.

Figure 9:
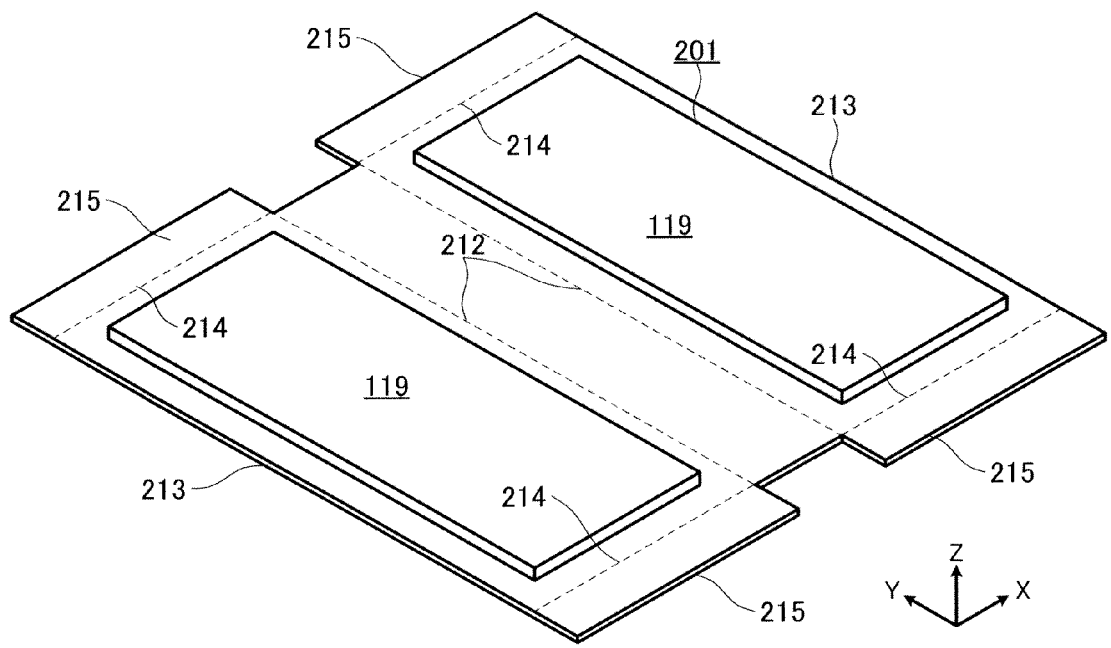
FIG. 9 is a perspective view of the flat plate.

FIG. 9 is a perspective view of the flat plate.

Figure 10:
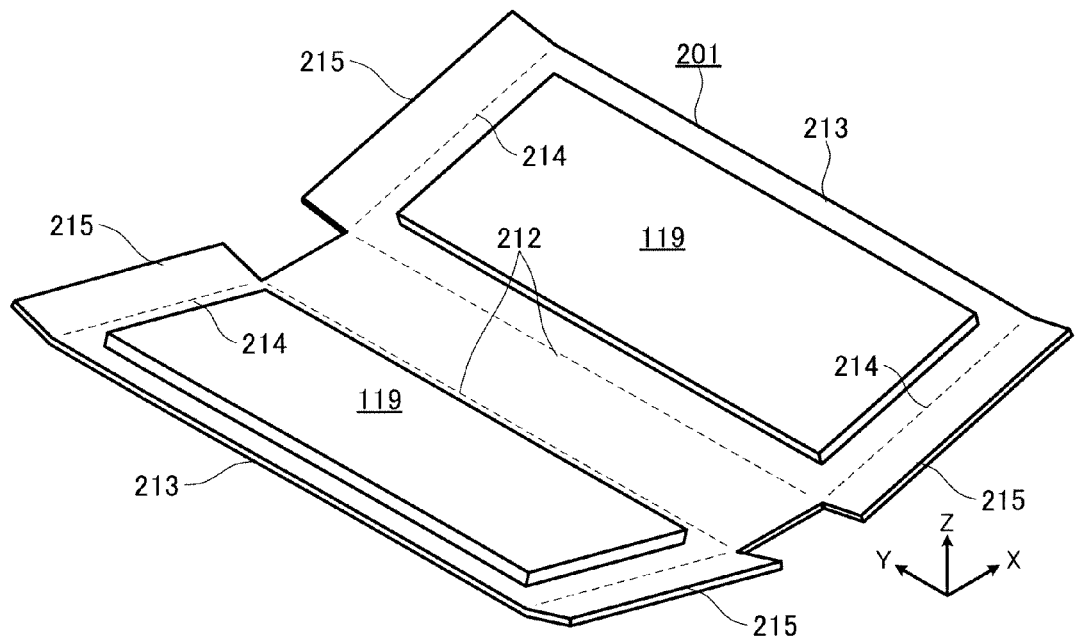
FIG. 10 is a perspective view of a midstream of the folding process of the flat plate made of metal.

FIG. 10 is a perspective view of a midstream of the folding process of the flat plate made of metal.

First, a bulge step is performed for a metal plate which is large and flat such that a bulge portion 119 is formed. The bulge portion 119 is formed by a press work or the like. In this way, since a process can be performed for the flat metal plate such that the bulge portion 119 is formed, the bulge portion 119 can be formed with a great ease.

Next, a sheet of the flat plate 201 made of metal and having an unfolded form of the container 101 is formed. The formation of the flat plate 201 is performed by a work such as blanking from a large metal plate after the bulge work.

In this way, by forming the flat plate 201 after the bulge work, small deformations of the metal plate generated in the bulge work do not affect the dimension and the form of the flat plate 201. Therefore, a defect such as one in which a gap is generated in an abutting portion of the container 101 before welding which is formed by folding can be prevented, and thus welding is easier. Moreover, the mechanical strength after the welding can be enhanced.

Moreover, in the bulge step according to the present manufacturing method, the bulge portions 119 each of which bulges inward of the battery 100 after manufacturing are formed on both of the two long-sidewall corresponding portions 213.

With the configuration, in the state of the battery 100 after manufacturing, vibration of the electrode assembly 102 in the inward of the battery 100 can be restricted. Therefore, even in the case where vibration or an impact occurs to the battery 100, damage in the interior of the battery 100 such as the electrode assembly 102 and the like can be reduced. The container 101 of the battery 100 can be prevented from swelling and the swelling of the electrode assembly 102 can be restricted by the bulge portions 119.

It should be noted that the blanking work for forming the flat plate 201 and the press work for forming the bulge portions 119 may be simultaneously performed, and the bulge work may be performed after the blanking work for forming the flat plate 201 and the like.

Figure 12:
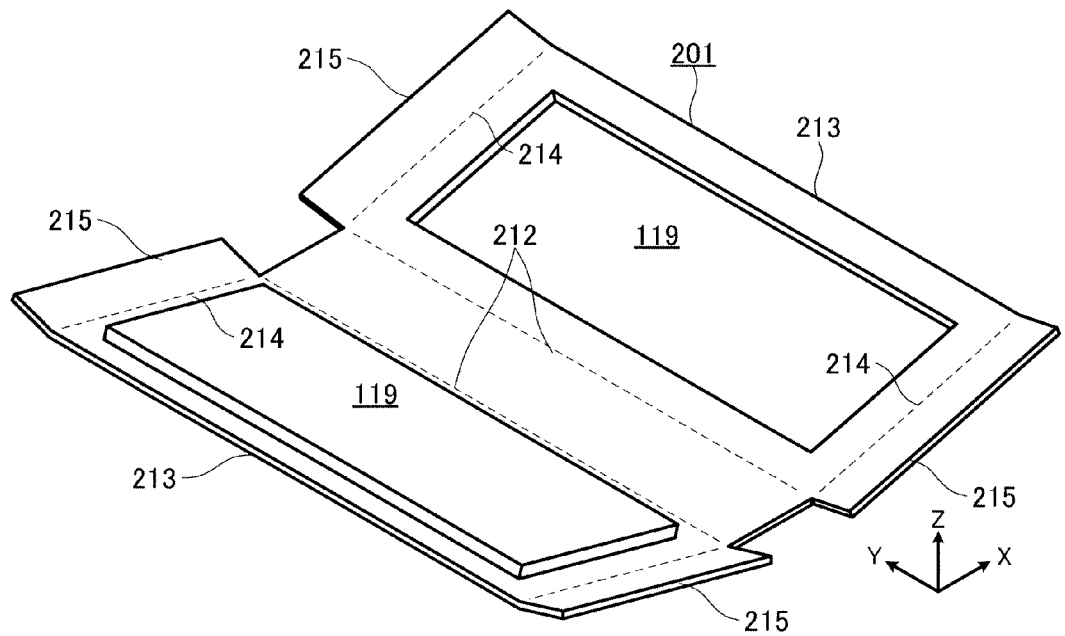
FIG. 12 is a perspective view of a midstream of the folding process of the flat plate made of metal.

Next, the flat plate 201 is folded by a folding process as shown in FIG. 12. Here, since the bulge portion 119 are formed on each of the long-sidewall corresponding portions 213, the structural strength of the long-sidewall portions is enhanced. Therefore, a defect such as one in which the long-sidewall corresponding portions 213 are deformed by the folding work or the like can be avoided as much as possible. Furthermore, it is favorable that the folding work is performed at the longer side corresponding portions 212 after being folded at the folding lines 214 in advance. With this, the short-sidewall corresponding portions 215 function as ribs of the long-sidewall corresponding portions 213, and therefore the structural strength of the long-sidewall portions can be enhanced.

Next, abutting portions 202 which are portions of the flat plate 201 and which are mutually abutting after the folding process are joined by welding (welding step).

As described above, the container 101 which has an opening portion 205 on a surface and which has a cuboid shape with a bottom is manufactured.

Figure 11:
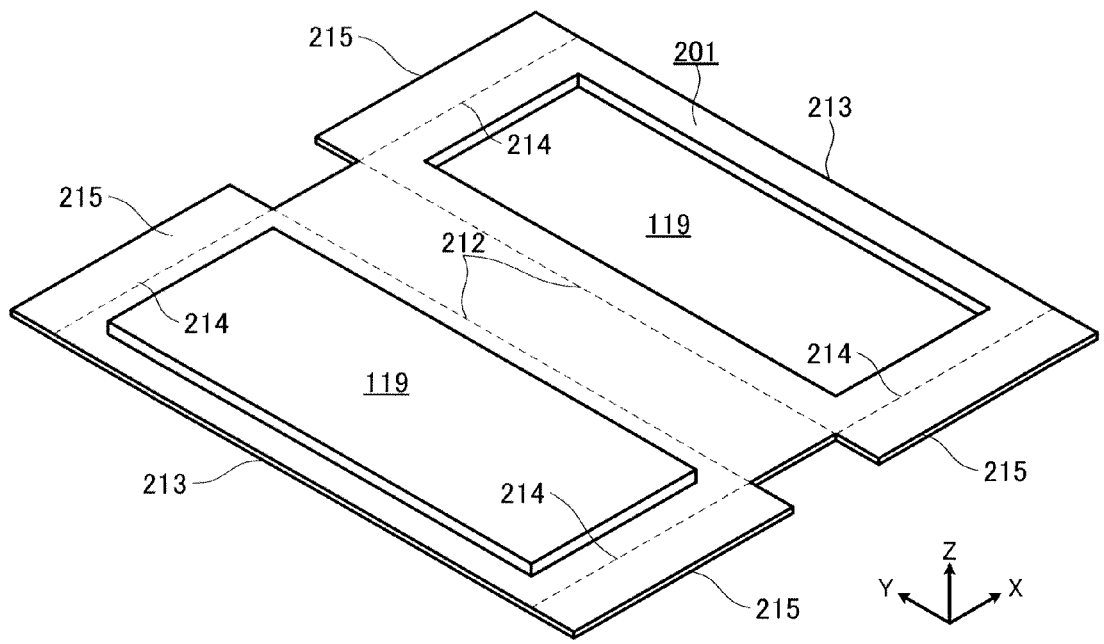
FIG. 11 is a perspective view of the flat plate.

It should be noted that as shown in FIGS. 11 and 12, a bulge portion 119 which bulges inward of the battery 100 after manufacturing may be formed on one of the long-sidewall corresponding portions 213, and another bulge portion 119 which matches and fits the bulge form of the bulge portion 119 and bulges outward of the battery 100 may be formed on the other long-sidewall corresponding portion 213.

With the configuration, in the case where a battery pack is formed in which the manufactured batteries 100 are tightly arranged, the bulge portions 119 fit with each other and the structural strength of the whole battery pack can be enhanced. Moreover, the contact area between the batteries 100 is increased and therefore the heat conductivity can be enhanced.

Although only some exemplary embodiment of the present invention has been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention can be applied to batteries including a rechargeable battery (secondary battery) and is particularly well suited as a rechargeable battery installed in moving vehicles, such as an automobile, which want a lightweight and a large electric current.

REFERENCE SIGNS LIST

100 Secondary battery
101 Container
102 Electrode assembly
103 Electrode terminal
104 Lid
111 Bottom portion
112 Longer side portion
113 Long-sidewall portion
114 Shorter side portion
115 Short-sidewall portion
116 Welded portion
121 Current collector component
141 Second welded part
201 Flat plate
202 Abutting portion
205 Opening portion
212 Longer side corresponding portion
213 Long-sidewall corresponding portion
214 Folding line

The invention claimed is:
1. A battery, comprising:
a container consisting essentially of a metal plate as folded-over to form a bottom portion, long-sidewall portions each standing on a corresponding one of longer side portions of the bottom portion, and short-sidewall portions each standing on a corresponding one of shorter side portions of the bottom portion, the long-sidewall portions and the short-sidewall portions defining an opening portion opposite to the bottom portion, at least one of the short-sidewall portions including a first welded part that extends toward the opening portion;

an electrode assembly housed in the container;

a lid closing the opening portion; and an electrode terminal.

2. The battery according to claim 1, wherein the first welded part is located in said each of the short-sidewall portions.

3. The battery according to claim 1, wherein a difference in a dimension between the bottom portion and the opening portion of the container is less than or equal to 1 mm.

4. The battery according to claim 1, wherein a variation in a thickness of the long-sidewall portions is less than or equal to 1% of a maximum thickness of the long-sidewall portions.

5. The battery according to claim 1, wherein said at least one of the short-sidewall portions further includes a second welded part, the first welded part being provided at an intermediate part of said each of the short-sidewall portions and extending in a direction intersecting a plane of the bottom portion, and the second welded part extending in a direction intersecting the first welded part and joining said each of the short-sidewall portions and the bottom portion.

6. The battery according to claim 1, wherein said each of the long-sidewall portions includes a bulge portion which bulges inward of the battery.

7. The battery according to claim 1, wherein the metal plate comprises abutting portions, and wherein the abutting portions abut in a planar manner and are welded to each other in the first welded part.

8. The battery according to claim 1, wherein the lid is welded to the container.

9. A battery, comprising:

a container consisting essentially of a metal plate that comprises abutting portions, the container including a bottom portion, long-sidewall portions standing on long sides of the bottom portion, short-sidewall portions standing on short sides of the bottom portion, the long-sidewall portions and the short-sidewall portions defining an opening opposite to the bottom portion, at least one of the short-sidewall portions including a first welded part that extends toward the opening;

an electrode assembly housed in the container; and a lid closing the opening, wherein the at least one of the long-sidewall portions and the short-sidewall portions that includes the first welded part further includes a second welded part extending in a direction intersecting the first welded part, and wherein the abutting portions abut in a planar manner and are welded to each other in the first welded part.

10. The battery according to claim 9, wherein the said at least one of the short-sidewall portions that includes the first welded part further includes a third welded part extending in the direction intersecting the first welded part.

11. The battery according to claim 10, wherein the third welded part extends parallel to the second welded part.

12. The battery according to claim 11, wherein the third welded part joins said each of the short-sidewall portions and the lid.

13. The battery according to claim 1, wherein said at least one of the short-sidewall portions further includes a second welded part extending in a direction intersecting the first welded part, and wherein the long-sidewall portions include the second welded part in a direction intersecting the short-sidewall portions.

14. The battery according to claim 13, wherein the second welded part extends in a direction intersecting the first welded part, the second welded part joining said each of the short-sidewall portions and the bottom portion.

15. The battery according td claim 1, wherein the first welded part is provided at an intermediate part of said each of the short-sidewall portions and extends in a direction intersecting a plane of the bottom portion.

* * * * *